A. H. MIDGLEY.
VARIABLE SPEED DYNAMO ELECTRIC MACHINE.
APPLICATION FILED NOV. 23, 1915.
1,307,099. Patented June 17, 1919.
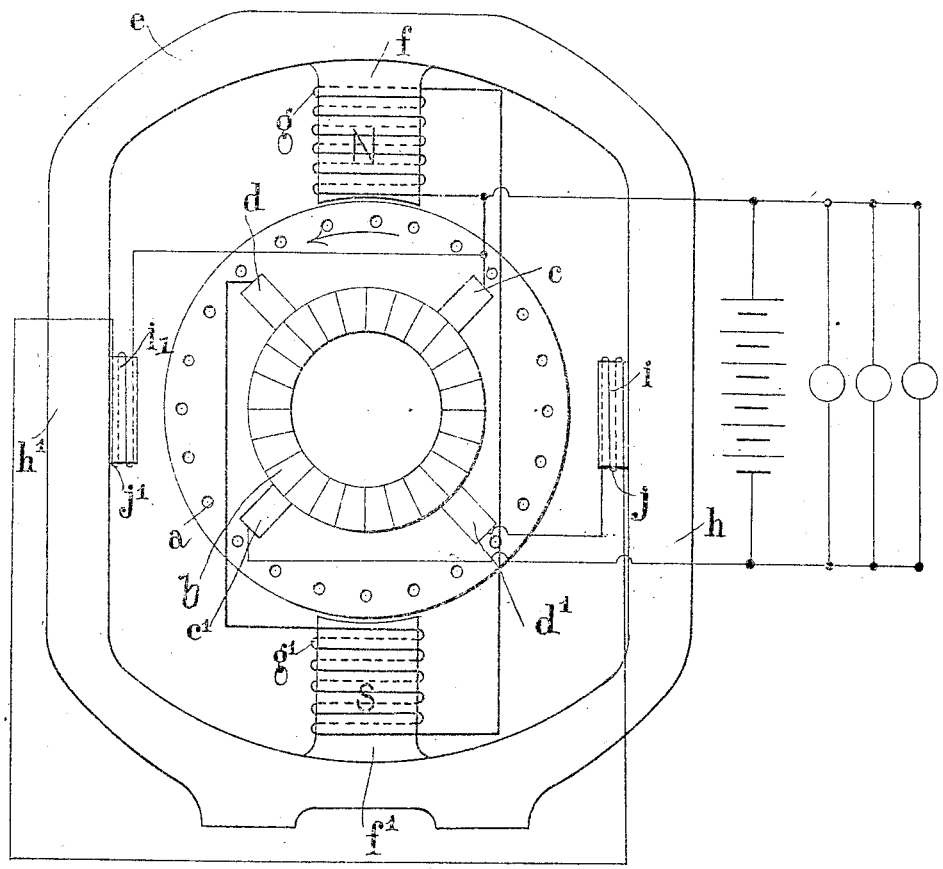
Inventor:
A. H. Midgley
by Buck Parker Smith
Attorney:

UNITED STATES PATENT OFFICE.

ALBERT HENRY MIDGLEY, OF ACTON VALE, ENGLAND, ASSIGNOR OF ONE-HALF TO CHARLES ANTHONY VANDERVELL, OF WARPLE WAY, ACTON VALE, ENGLAND.

VARIABLE-SPEED DYNAMO-ELECTRIC MACHINE.

1,307,099.          Specification of Letters Patent.     Patented June 17, 1919.

Application filed November 23, 1915. Serial No. 63,132.

*To all whom it may concern:*

Be it known that I, ALBERT HENRY MIDGLEY, a subject of the King of Great Britain and Ireland, and residing at Warple Way, Acton Vale, in the county of Middlesex, England, have invented certain new and useful Improvements in and Relating to Variable-Speed Dynamo-Electric Machines, of which the following is a specification.

This invention relates to variable speed self-regulating dynamo machines, and more particularly of the kind used in parallel with a battery of accumulators for lighting purposes on motor cars and the like.

It is known in self-exciting, self-regulating variable speed dynamo machines having main and auxiliary poles and main and auxiliary brushes and in which the auxiliary poles are provided with excitation windings producing a field acting in opposition to the armature cross-field, to connect the two ends of the excitation winding on each auxiliary pole to a main and auxiliary brush respectively which are arranged at both sides of the auxiliary pole and span the armature conductors under the latter, and to connect the two ends of the excitation winding on each main pole with the main and auxiliary brush arranged at both sides of the main pole and spanning the armature conductors under the same.

The object of the invention is to increase the output of a machine of the above construction, other objects being to obtain the maximum output at a lower speed and to obtain a satisfactory drooping characteristic.

According to the present invention only a portion of the armature winding of a machine of the above construction is utilized for the purpose of exciting the poles and more particularly the auxiliary poles, this being effected by reason of the excitation winding of the auxiliary poles being connected together in series and the free ends of the excitation windings thus connected together being connected with the main and auxiliary brush arranged at both sides of one auxiliary pole only and spanning the armature conductor under the same while the excitation windings on the main poles are connected together in a similar way with respect to the main and auxiliary brush arranged on either side of one main pole only.

In the known machines of the character referred to and more particularly in which the excitation coils on the auxiliary poles are of low resistance, the de-magnetizing action on the main field at any speed is greater than in the machines constructed according to the present invention owing to the current flowing through the auxiliary excitation coils necessary for producing a predetermined de-magnetizing action being generated at a lower speed, and consequently in the known machines the maximum output is obtained at a higher speed. By connecting both auxiliary excitation coils in series with each other and with a portion of the armature on one side only, according to the present invention, the number of armature conductors supplying current to these coils is reduced by one half which means that the generated E. M. F. in the armature coils would have to be increased if it is desired to produce the same de-magnetizing action. As the extra E. M. F. has to be generated by the cross field, the speed of the machine would have to be increased before the same current is flowing through the auxiliary coils which is required to produce a predetermined de-magnetizing action on the main field, and consequently, in the machine according to the present invention, the maximum output is reached at a lower speed. On the other hand, as at any speed the de-magnetizing action of the current generated by the cross field is smaller in the present machine than in the machines of the same character as hitherto proposed, the main field is stronger, and consequently also the output is larger.

Referring to the accompanying drawing, illustrating the invention diagrammatically and by way of example, $a$ is the armature, $b$ the commutator, $c$, $c_1$ the main brushes, $d$, $d_1$ the auxiliary brushes, $e$ the magnet yoke, $f$, $f_1$ the main poles, and $g$, $g_1$ the excitation windings which are mounted on the main poles $f$, $f_1$ respectively, and are connected in series with each other, their free ends being connected to the main brush $c$ and auxiliary brush $d$, respectively, spanning the armature conductors under the main pole $f$, $h$, $h_1$ are the portions of the magnet yoke $e$ in which regulating poles are induced by the armature cross field, $i$, $i_1$ are two brass supports attached to the portions $h$, $h_1$ respectively, and carrying excitation windings $j$, $j_1$ respectively, which are connected in series with one another and the free ends of which are connected to the main brush $c$ and auxiliary brush $d_1$ respectively, the latter two brushes spanning the armature conductors under the regulating pole $h$. The flux produced by the excitation windings $i$, $i_1$ opposes the armature cross field and is smaller than the latter.

According to a test made with a 12 volt machine constructed in the manner hereinbefore described, and running in counter clockwise direction as shown by the arrow in the drawing, the generating speed was attained at about 500 revolutions and the maximum output of 12 volts at about 1500 revolutions, the current in the excitation coils $g$ dropping gradually from about 1.5 amperes at 1000 revolutions to about 0.9 at 4000 revolutions, the current in the regulating coils $j$, $j_1$ increasing from about 0.5 at 1000 revolutions to about 3 amperes at 4000 revolutions, and the current of the machine dropping from about 14 amperes at 1500 revolutions to about 9.5 amperes at 4000.

Although I have described my invention in connection with a bipolar machine, it will be understood that the same may be applied also to a multipolar machine.

Having now described my invention what I claim as new and desire to secure by Letters Patent is:—

A dynamo electric machine comprising an armature, armature conductors thereon, a commutator, a field magnet having main poles and auxiliary induced poles lying between the main poles and induced by the armature cross flux, main and auxiliary brushes on the commutator arranged alternately between the main and the auxiliary induced poles and an excitation winding on each main pole, and an excitation winding used in conjunction with each auxiliary induced pole, the excitation windings on the main poles being connected in series with one another and their free ends with a main and an auxiliary brush, respectively, spanning the armature conductors under one main pole only, and the excitation windings used in conjunction with each auxiliary induced pole being wound to produce a flux in opposition to the armature cross flux and being connected in series with one another and their free ends with a main and an auxiliary brush, respectively, spanning the armature conductors under one regulating pole only, as and for the purpose set forth.

In testimony whereof I have signed my name to this specification.

ALBERT HENRY MIDGLEY.